US009383513B2

(12) United States Patent
Lee et al.

(10) Patent No.: US 9,383,513 B2
(45) Date of Patent: Jul. 5, 2016

(54) WAVEGUIDE STRUCTURE

(71) Applicant: Taiwan Semiconductor Manufacturing Company, Ltd., Hsin-Chu (TW)

(72) Inventors: Wan-Yu Lee, Taipei (TW); Ying-Hao Kuo, Hsinchu (TW); Tien-I Bao, Dayuan Township (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 124 days.

(21) Appl. No.: 13/938,730

(22) Filed: Jul. 10, 2013

(65) Prior Publication Data

US 2015/0016793 A1    Jan. 15, 2015

(51) Int. Cl.
| | |
|---|---|
| *G02B 6/02* | (2006.01) |
| *G02B 6/125* | (2006.01) |
| *G02B 6/136* | (2006.01) |
| *G02B 6/12* | (2006.01) |
| *G02B 6/122* | (2006.01) |

(52) U.S. Cl.
CPC ............. *G02B 6/125* (2013.01); *G02B 6/136* (2013.01); *G02B 6/122* (2013.01); *G02B 2006/12176* (2013.01)

(58) Field of Classification Search
CPC .......................... G02B 6/02; G02B 2006/12176

USPC ........................................... 385/14, 129–132
See application file for complete search history.

(56) References Cited

U.S. PATENT DOCUMENTS

| | | | | |
|---|---|---|---|---|
| 6,002,823 | A  * | 12/1999 | Chandross | G02B 6/125 385/129 |
| 6,310,999 | B1 * | 10/2001 | Marcuse | G02F 1/065 385/132 |
| 6,498,889 | B2 * | 12/2002 | Kinoshita | 385/131 |
| 6,553,170 | B2 * | 4/2003 | Zhong | C23C 16/401 385/129 |
| 6,768,855 | B1 * | 7/2004 | Bakke et al. | 385/129 |
| 6,834,152 | B2 * | 12/2004 | Gunn et al. | 385/130 |
| 7,286,741 | B2 * | 10/2007 | Hanashima | G02B 6/13 385/129 |
| 7,469,558 | B2 * | 12/2008 | Demaray | B29D 11/00663 65/386 |
| 8,891,159 | B2 * | 11/2014 | Hayakawa | 359/328 |
| 2013/0129278 | A1 * | 5/2013 | Katsuyama | 385/14 |

* cited by examiner

*Primary Examiner* — Daniel Petkovsek
(74) *Attorney, Agent, or Firm* — Slater Matsil, LLP

(57) ABSTRACT

A waveguide structure includes a bottom dielectric layer, a core layer disposed over the bottom dielectric layer, an etch stop layer disposed over the core layer, and a cladding layer or a buffer layer disposed over the etch stop layer. The waveguide structure is configured to guide a light signal through different geography, such as straight, taper, turning, grating and tight coupling sections.

20 Claims, 4 Drawing Sheets

WAVEGUIDE STRUCTURE

TECHNICAL FIELD

The present disclosure relates generally to an integrated circuit and more particularly an optical waveguide structure.

BACKGROUND

In some photonic integrated circuits, waveguides are formed in the form of a rib or a channel structure. However it is difficult to control different etching depth levels across a wafer and across different patterns for rib type waveguides, which affects performance and yield. An exposed waveguide core during multi-step etching also results in a rough surface with significant transmission loss.

BRIEF DESCRIPTION OF THE DRAWINGS

Reference is now made to the following descriptions taken in conjunction with the accompanying drawings, in which.

DETAILED DESCRIPTION

Figure 1A:
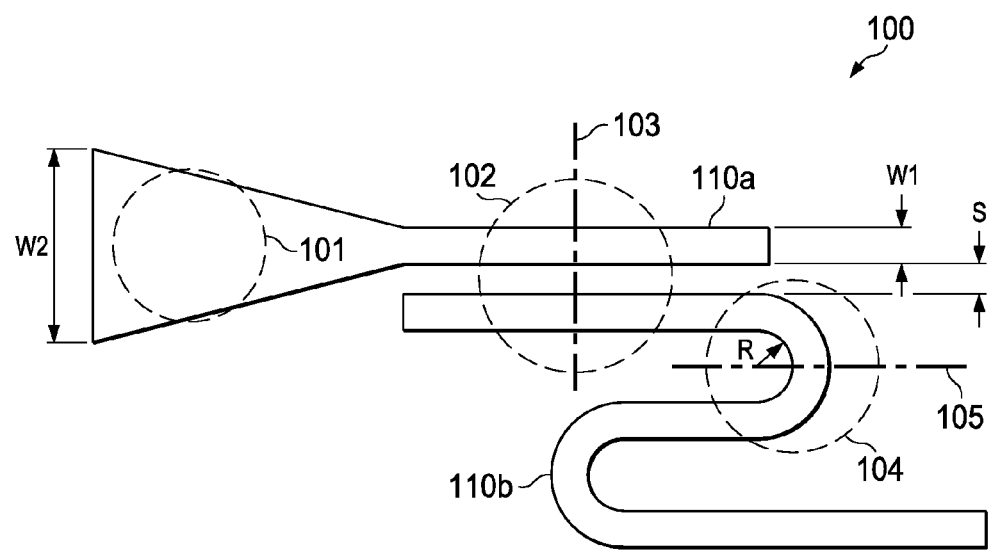
FIG. 1A is a schematic top view of an exemplary waveguide structure according to some embodiments.

The making and using of various embodiments are discussed in detail below. It should be appreciated, however, that the present disclosure provides many applicable inventive concepts that can be embodied in a wide variety of specific contexts. The specific embodiments discussed are merely illustrative of specific ways to make and use, and do not limit the scope of the disclosure.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

FIG. 1A is a schematic top view of an exemplary waveguide structure 100 according to some embodiments. The waveguide structure 100 is configured to guide a light signal. The waveguide structure 100 includes core layers 110a and 110b with a coupling section 102 and a bending section 104 after the coupling section 102. The cross section views of the coupling section 102 and the bending section 104 are shown in FIG. 1B and FIG. 1C respectively.

A core layer portion 110a is arranged to have the incident light signal coming from a wider section 101, and then the light signal is coupled to another core layer portion 110b at the coupling section 102. The core layer 110b with a bending section 104 guides the light signal with a desired wavelength depending on a bending radius R.

In some embodiments, the core layer 110a has a width W1 ranging from 0.3 μm to 3 μm and W2 from 5 μm to 15 μm at the wide end. In some embodiments, the core layer 110b has a width ranging from 0.3 μm to 3 μm. In some embodiments, the bending radius R ranges from 5 μm to 100 μm. In some embodiments, the spacing S between the core layers 110a and 110b ranges from 150 nm to 500 nm.

Figure 1B:
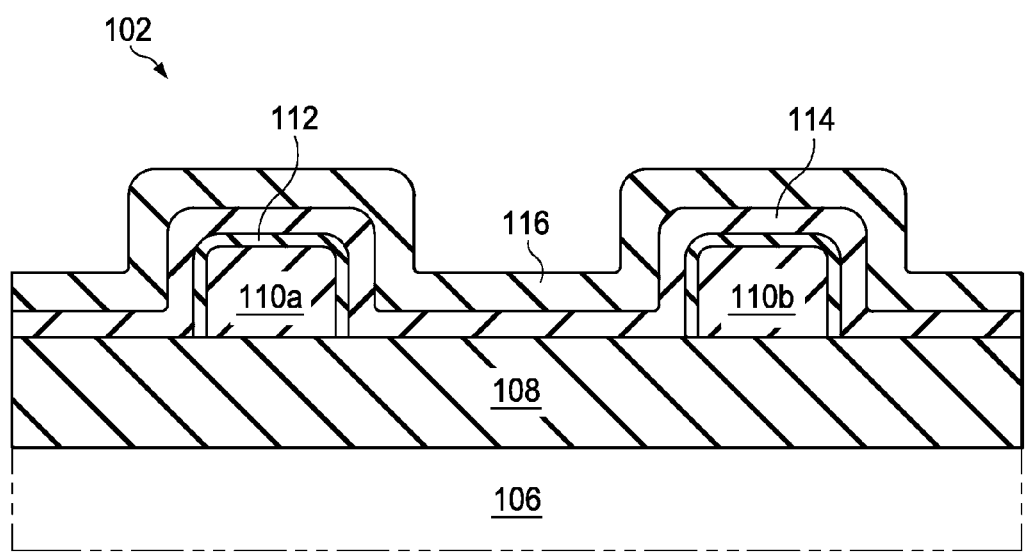
FIGS. 1B-1C are cross sections of the exemplary waveguide structure in FIG. 1A according to some embodiments.
Figure 1C:
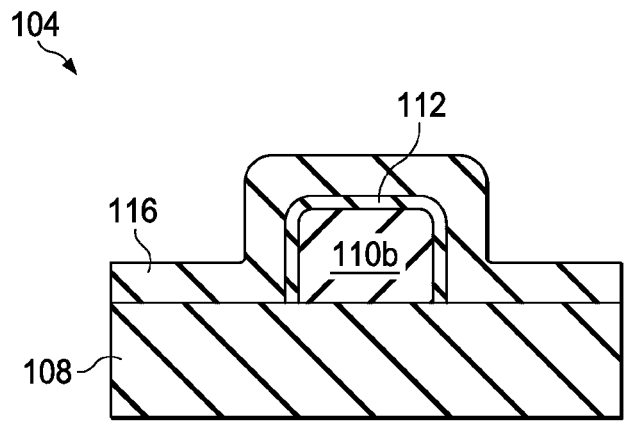

FIGS. 1B-1C are cross sections of the exemplary waveguide structure in FIG. 1A according to some embodiments. FIG. 1B is a cross section view of the coupling section 102 in FIG. 1A along a cross section line 103. The substrate 106 comprises silicon, silicon dioxide, aluminum oxide, sapphire, germanium, gallium arsenide (GaAs), an alloy of silicon and germanium, indium phosphide (InP), silicon on insulator (SOI), or any other suitable material. The substrate 106 is not shown in subsequent figures for simplicity.

A bottom dielectric layer 108 is disposed over a substrate 106. The bottom dielectric layer 108 has a thickness ranging from 0.2 μm to 1 μm in some embodiments. The bottom dielectric layer 108 has a thickness greater than 0.5 μm in some other embodiments. The bottom dielectric layer 108 has a refractive index (RI) ranging from 1.2 to 1.5 and comprises silicon dioxide or a low-k dielectric material in some embodiments.

The core layer 110a and 110b is disposed over the bottom dielectric layer 108. The core layer 110a and 110b has an RI ranging from 1.8 to 2.2, a thickness ranging from 100 nm to 500 nm, and comprises silicon nitride ($Si_xN_y$) or a high-k dielectric material in some embodiments.

An etch stop layer 112 is disposed over the core layer 110a and 110b. The etch stop layer 112 has an equal or higher refractive index (RI) compared to the cladding layer 116 and a lower RI compared to the core layer 110a and 110b in some embodiments. The etch stop layer 112 has an RI ranging from 1.2 to 1.6 in some embodiments. The etch stop layer 112 covers the core layer 110a and 110b conformally with no voids in some embodiments. The etch stop layer 112 has a thickness ranging from 150 Å to 300 Å and comprises silicon oxynitride ($SiO_xN_x$) or a low-k dielectric material in some embodiments.

A buffer layer 114 is disposed over the etch stop layer 112. The buffer layer 114 between the etch stop layer 112 and the cladding layer 116 reduces scattering loss and increases optical coupling efficiency. The buffer layer 114 has a higher refractive index (RI) compared to the cladding layer 116 and the etch stop layer 112, and a lower or equal RI compared to the core layer 110a and 110b in some embodiments. The buffer layer 114 has an RI ranging from 1.6 to 1.8 in some embodiments. The buffer layer 114 has a thickness ranging from 500 Å to 2500 Å and comprises silicon oxynitride ($SiO_xN_x$) or a high-k dielectric material in some embodiments.

A cladding layer 116 is disposed over the buffer layer 114. The cladding layer 116 has an RI ranging from 1.2 to 1.5 in some embodiments. The cladding layer 116 has a thickness ranging from 0.2 μm to 1 μm in some embodiments, or greater than 0.5 μm in some other embodiments. The cladding layer 116 comprises silicon dioxide or a low-k dielectric material in some embodiments.

FIG. 1C is a cross section view of the bending section 102 in FIG. 1A along a cross section line 105. The cross section view in FIG. 1C is similar to the cross section view in FIG. 1B except that the buffer layer 114 is not present.

The waveguide structures 102 in FIG. 1B and 104 in FIG. 1C include the etch stop layer 112 covering the core layer 110a and/or 110b that reduces the surface roughness of the core layer 110a and/or 110b from later etching processes. Also the buffer layer 114 in FIG. 1B between the etch stop layer 112 and the cladding layer 116 could reduce scattering loss and increase coupling efficiency.

Figure 2A:
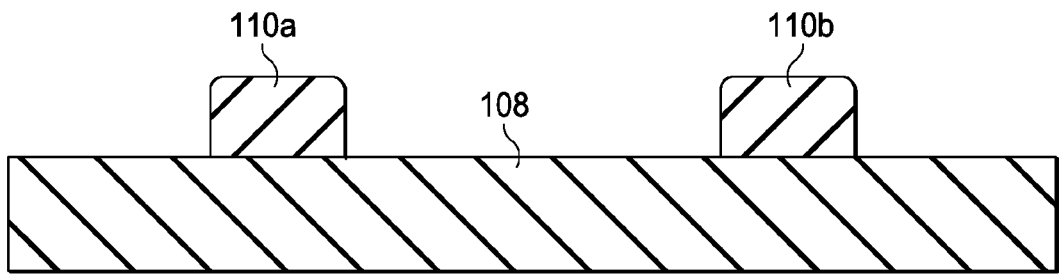
FIGS. 2A-2C are exemplary intermediate fabrication steps of the coupling section of the waveguide structure in FIG. 1A according to some embodiments.
Figure 2B:
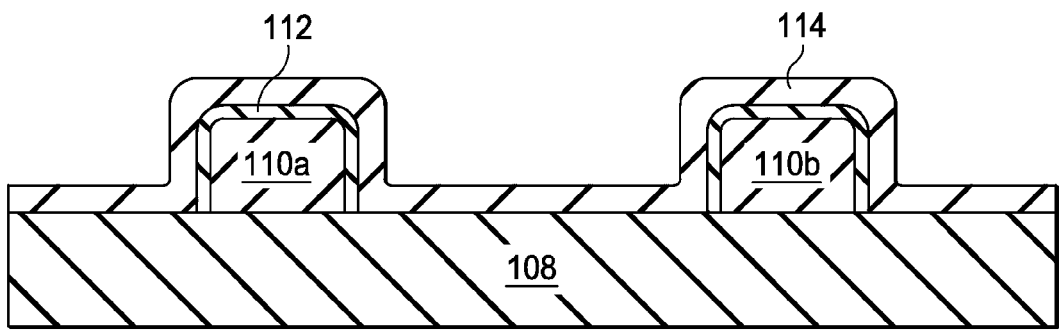
Figure 2C:
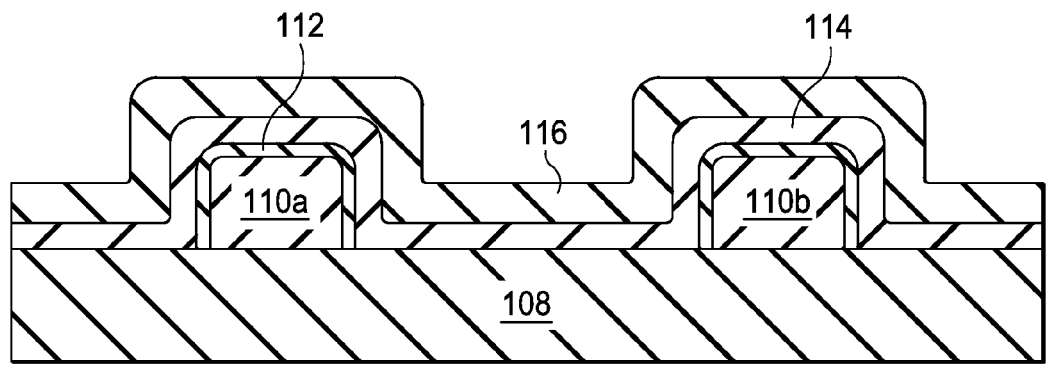

FIGS. 2A-2C are exemplary intermediate fabrication steps of the coupling section 102 of the waveguide structure in FIG. 1A according to some embodiments. In FIG. 2A, the core layer (such as 110a and 110b) is formed over the bottom dielectric layer 108 by plasma-enhanced chemical vapor deposition (PECVD) and dry etching, for example. The core layer 110a and 11b has a generally uniform thickness and there is no need for different etching depth control.

The bottom dielectric layer 108 has a refractive index (RI) ranging from 1.2 to 1.5 and comprises silicon dioxide or a low-k dielectric material in some embodiments. The bottom dielectric layer 108 has a thickness ranging from 0.2 µm to 1 µm in some embodiments. The bottom dielectric layer 108 has a thickness greater than 0.5 µm in some other embodiments. The core layer 110a and 110b has an RI ranging from 1.8 to 2.2, a thickness ranging from 100 nm to 500 nm, and comprises silicon nitride ($Si_xN_y$) in some embodiments.

In FIG. 2B, the etch stop layer 112 is formed over the core layer 110a and 110b by atomic layer deposition (ALD), physical vapor deposition (PVD), or CVD, for example. The buffer layer 114 is deposited over the etch stop layer 112 and the bottom dielectric layer 108 by PECVD, for example.

The etch stop layer 112 has an RI ranging from 1.2 to 1.6 in some embodiments. The etch stop layer 112 has a thickness ranging from 150 Å to 300 Å and comprises silicon oxynitride ($SiO_xN_x$) or a low-k dielectric material in some embodiments. The etch stop layer 112 covering the core layer 110a and 110b reduces the surface roughness of the core layer 110a and 110b from later etching processes.

Also the buffer layer 114 could reduce scattering loss and increase coupling efficiency. The buffer layer 114 has an RI ranging from 1.6 to 1.8 in some embodiments. The buffer layer 114 has a thickness ranging from 500 Å to 2500 Å and comprises silicon oxynitride ($SiO_xN_x$) or a high-k dielectric material in some embodiments.

In FIG. 2C, the cladding layer 116 is formed over the buffer layer 114 by PECVD, for example. The cladding layer 116 has an RI ranging from 1.2 to 1.5 in some embodiments. The cladding layer 116 has a thickness ranging from 0.2 µm to 1 µm in some embodiments. The cladding layer 116 has a thickness greater than 0.5 µm in some other embodiments. The cladding layer 116 comprises silicon dioxide or a low-k dielectric material in some embodiments.

Figure 3A:
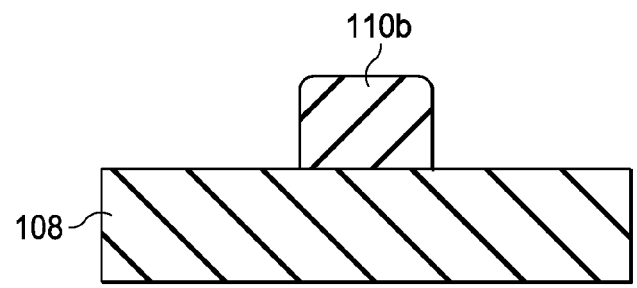
FIGS. 3A-3D are exemplary intermediate fabrication steps of the bending section of the waveguide structure in FIG. 1A according to some embodiments.

FIGS. 3A-3D are exemplary intermediate fabrication steps of the bending section 104 of the waveguide structure in FIG. 1A according to some embodiments. In FIG. 3A, the core layer 110b is formed over the bottom dielectric layer 108 by plasma-enhanced chemical vapor deposition (PECVD) and dry etching, for example. The formation of the core layer 110b has a generally uniform thickness and there is no need for different etch depth control.

The bottom dielectric layer 108 has a refractive index (RI) ranging from 1.2 to 1.5 and comprises silicon dioxide or a low-k dielectric material in some embodiments. The bottom dielectric layer 108 has a thickness ranging from 0.2 µm to 1 µm in some embodiments. The bottom dielectric layer 108 has a thickness greater than 0.5 µm in some other embodiments. The core layer 110b has an RI ranging from 1.8 to 2.2 and a thickness ranging from 100 nm to 500 nm, and comprises silicon nitride ($Si_xN_y$) or a high-k dielectric material in some embodiments.

Figure 3B:
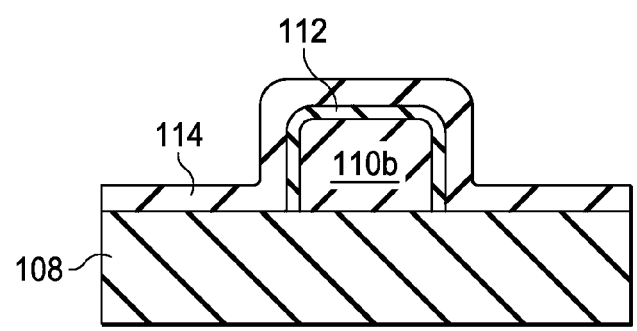

In FIG. 3B, the etch stop layer 112 is formed over the core layer 110b by ALD, PVD, or CVD, for example. The buffer layer 114 is deposited over the etch stop layer 112 and the bottom dielectric layer 108 by PECVD, for example.

The etch stop layer 112 has an RI ranging from 1.2 to 1.6 in some embodiments. The etch stop layer 112 has a thickness ranging from 150 Å to 300 Å and comprises silicon oxynitride ($SiO_xN_x$) or a low-k dielectric material in some embodiments. The etch stop layer 112 covering the core layer 110b reduces the surface roughness of the core layer 110b from later etching processes.

The buffer layer 114 has an RI ranging from 1.6 to 1.8 in some embodiments. The buffer layer 114 has a thickness ranging from 500 Å to 2500 Å and comprises silicon oxynitride ($SiO_xN_x$) in some embodiments.

Figure 3C:
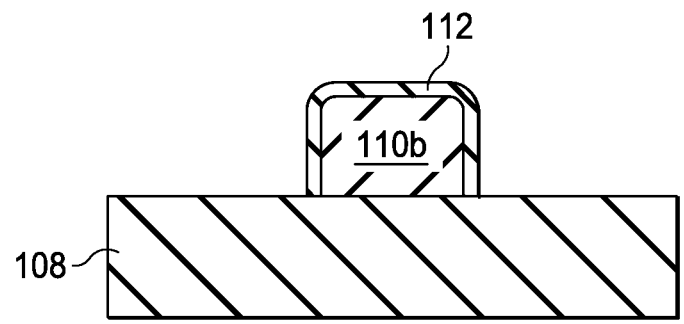

In FIG. 3C, the buffer layer 114 is etched by dry or wet etching in some embodiments. Even though the buffer layer 114 is etched in the bending section 104 in FIG. 3C, the buffer layer 114 in the coupling section 102 in FIG. 2C remains as a part of the waveguide structure to reduce scattering loss and increase coupling. In other embodiments, bending section 104 could be covered with masking material (e.g., photoresist material or a hard mask material) during formation of buffer layer 114 over core layer 110a and 110b in coupling section 102, in order to prevent formation of buffer layer 114 in bending section 104. This avoids the need to remove buffer layer 114 from core layer 110b in bending section 104.

Figure 3D:
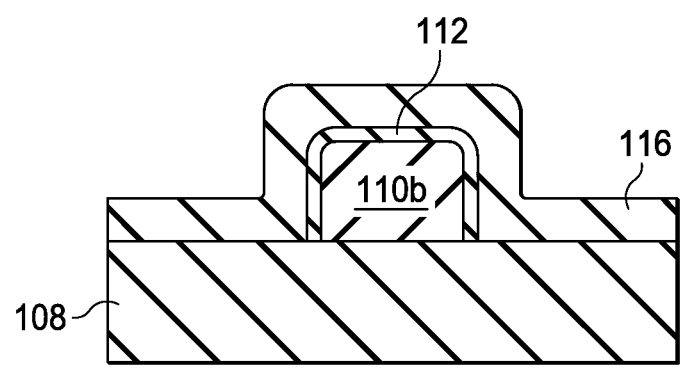

In FIG. 3D, the cladding layer 116 is formed over the etch stop layer 112 and the bottom dielectric layer 108 by PECVD, for example. The cladding layer 116 has a thickness ranging from 0.2 µm to 1 µm in some embodiments. The cladding layer 116 has a thickness greater than 0.5 µm in some other embodiments. The cladding layer 116 comprises silicon dioxide or a low-k dielectric material in some embodiments.

According to some embodiments, a waveguide structure includes a bottom dielectric layer, a core layer disposed over the bottom dielectric layer, an etch stop layer disposed over the core layer, and a cladding layer disposed over the etch stop layer. The waveguide structure is configured to guide a light signal.

According to some embodiments, a method of fabricating a waveguide structure includes forming a core layer over a bottom dielectric layer. An etch stop layer is formed over the core layer. A cladding layer is formed over the etch stop layer. The core layer, the etch stop layer, and the cladding layer are arranged to guide a light signal.

A skilled person in the art will appreciate that there can be many embodiment variations of this disclosure. Although the embodiments and their features have been described in detail, it should be understood that various changes, substitutions and alterations can be made herein without departing from the spirit and scope of the embodiments. Moreover, the scope of the present application is not intended to be limited to the particular embodiments of the process, machine, manufacture, and composition of matter, means, methods and steps described in the specification. As one of ordinary skill in the art will readily appreciate from the disclosed embodiments, processes, machines, manufacture, compositions of matter, means, methods, or steps, presently existing or later to be developed, that perform substantially the same function or achieve substantially the same result as the corresponding embodiments described herein may be utilized according to the present disclosure.

The above method embodiment shows exemplary steps, but they are not necessarily required to be performed in the order shown. Steps may be added, replaced, changed order, and/or eliminated as appropriate, in accordance with the spirit and scope of embodiment of the disclosure. Embodiments that combine different claims and/or different embodiments are within the scope of the disclosure and will be apparent to those skilled in the art after reviewing this disclosure.

What is claimed is:

1. A waveguide structure, comprising:
   a bottom dielectric layer;
   a core layer disposed over the bottom dielectric layer, the core layer comprising a first portion and a second portion, the first portion and the second portion having a spacing between them, the spacing ranging from 150 nm to 500 nm;
   an etch stop layer disposed over the core layer;
   a buffer layer disposed over the etch stop layer; and
   a cladding layer disposed over the etch stop layer and the buffer layer,
   wherein the waveguide structure is configured to guide a light signal, the core layer comprises silicon nitride or a high-k dielectric material, and the cladding layer comprises silicon dioxide or a low-k dielectric material.

2. The waveguide structure of claim 1, wherein the etch stop layer has an equal or higher refractive index compared to the cladding layer and a lower refractive index compared to the core layer.

3. The waveguide structure of claim 1, wherein the buffer layer has a higher refractive index compared to the etch stop layer and the cladding layer, and a lower or equal refractive index compared to the core layer.

4. The waveguide structure of claim 1, wherein the second portion of the core layer comprises a bending section, and wherein the buffer layer is not disposed over the bending section of the core layer.

5. The waveguide structure of claim 4, wherein the bending section comprises a bending radius ranging from 5 μm to 100 μm.

6. The waveguide structure of claim 1, wherein the first portion of the core layer comprises a coupling section.

7. The waveguide structure of claim 1, wherein the bottom dielectric layer has a refractive index ranging from 1.2 to 1.5, the core layer has a refractive index ranging from 1.8 to 2.2, the etch stop layer has a refractive index ranging from 1.2 to 1.6, the buffer layer has a refractive index ranging from 1.6 to 1.8, and the cladding layer has a refractive index ranging from 1.2 to 1.5.

8. A device, comprising:
   a substrate;
   a bottom dielectric layer disposed over the substrate;
   a core layer comprising silicon nitride or a high-k dielectric material disposed over the bottom dielectric layer, the core layer comprising a first portion and a second portion, the first portion and the second portion having a spacing between them ranging from 150 nm to 500 nm;
   an etch stop layer conformally disposed over the core layer;
   a buffer layer disposed over the etch stop layer; and
   a cladding layer comprising silicon dioxide or a low-k dielectric layer disposed over the core layer, the etch stop layer and the buffer layer, the first and second portions of the core layer, the etch stop layer, the buffer layer, and the cladding layer being arranged to guide a light signal.

9. The device of claim 8, wherein the etch stop layer has an equal or higher refractive index compared to the cladding layer and a lower refractive index compared to the core layer.

10. The device of claim 8, wherein the buffer layer has a higher refractive index compared to the etch stop layer and the cladding layer, and a lower or equal refractive index compared to the core layer.

11. The device of claim 8, wherein the etch stop layer comprises silicon oxynitride or a low-k dielectric material, and the buffer layer comprises silicon oxynitride or a high-k dielectric material.

12. The device of claim 8, wherein the second portion of the core layer comprises a bending section, and wherein the buffer layer is not disposed over the bending section of the core layer.

13. The device of claim 12, wherein the bending section comprises a bending radius ranging from 5 μm to 100 μm.

14. The device of claim 8, wherein the first portion of the core layer comprises a coupling section.

15. A waveguide structure, comprising:
   a core layer comprising a first portion and a second portion, the first portion and the second portion having a spacing between 150 nm and 500 nm;
   an etch stop layer over the core layer;
   a buffer layer over the etch stop layer; and
   a cladding layer over the core layer, the etch stop layer and the buffer layer, the first portion of the core layer, the second portion of the core layer, the etch stop layer, the buffer layer, and the cladding layer being arranged to guide a light signal.

16. The waveguide structure of claim 15, wherein the first portion of the core layer has a first width at a first end and a second width smaller than the first width at a second end opposite the first end, and wherein the second portion has a third width.

17. The waveguide structure of claim 16, wherein the first width ranges from 5 μm to 15 μm, the second width ranges from 0.3 μm to 3 μm, and the third width ranges from 0.3 μm to 3 μm.

18. The waveguide structure of claim 15, wherein the etch stop layer is a patterned etch stop film.

19. The waveguide structure of claim 15, wherein the core layer comprises silicon nitride or a high-k dielectric material, the etch stop layer comprises silicon oxynitride or a low-k dielectric material, the buffer layer comprises silicon oxynitride or a high-k dielectric material, and the cladding layer comprises silicon dioxide or a low-k dielectric material.

20. The waveguide structure of claim 15, wherein the buffer layer is configured to reduce scattering loss and increase optical coupling efficiency.

* * * * *